United States Patent [19]

Kudo et al.

[11] 4,039,733

[45] Aug. 2, 1977

[54] NOVEL PETROLEUM RESIN FORMED BY A CATALYST SYSTEM CONTAINING (A) ORGANOALUMINUM COMPOUND AND (B) ALKYL HALIDE OR HYDROGEN HALIDE AS COCATALYST

[75] Inventors: Ken-ichi Kudo; Yoshihiko Kitagawa; Hideyuki Kuribayashi, all of Niihama, Japan

[73] Assignee: Sumitomo Chemical Company, Limited, Osaka, Japan

[21] Appl. No.: 570,071

[22] Filed: Apr. 21, 1975

[30] Foreign Application Priority Data

Apr. 23, 1974  Japan .................................. 49-46152

[51] Int. Cl.$^2$ ........................... C08F 4/52; C08F 2/00; C08F 10/00; C08F 136/20
[52] U.S. Cl. ..................................... 526/185; 260/889; 260/897 A; 526/76; 526/290
[58] Field of Search .................. 260/82; 526/290, 185, 526/76

[56] References Cited

U.S. PATENT DOCUMENTS

| | | | |
|---|---|---|---|
| 2,523,150 | 9/1950 | Schneider et al. | 260/82 |
| 2,604,465 | 7/1952 | Schneider et al. | 260/82 |
| 2,728,742 | 12/1955 | Banes et al. | 260/82 |
| 3,541,188 | 11/1970 | Srail | 260/82 |
| 3,644,252 | 2/1972 | Shenfeld et al. | 260/896 |
| 3,860,543 | 1/1975 | Masuda et al. | 260/82 |
| 3,875,095 | 4/1975 | Yamada et al. | 260/82 |

*Primary Examiner*—Herbert J. Lilling
*Attorney, Agent, or Firm*—Stevens, Davis, Miller & Mosher

[57] ABSTRACT

A petroleum resin produced by copolymerizing a monomer composition comprising (1) a mixture of 20 to 80 parts by weight of a so-called spent $C_4$- or $C_5$-fraction obtained by removing most of the dienic constituents from a fraction mainly of four or five carbon atoms formed in petroleum cracking and 80 to 20 parts by weight of styrene and/or a styrene derivative, and (2) 0.5 to 10 parts by weight of divinylbenzene for 100 parts by weight of the monomeric constituents contained in said mixture (1), with a catalyst system comprising an organoaluminum compound represented by the general formula $AlR_nX_{3-n}$ (wherein R is an alkyl group having 1 to 4 carbon atoms, X is a halogen atom, and n is a positive number from 1 to 2) as main catalyst and an alkyl halide or a hydrogen halide as co-catalyst in a hydrocarbon solvent at a temperature of 0° to 60° C.

16 Claims, No Drawings

NOVEL PETROLEUM RESIN FORMED BY A CATALYST SYSTEM CONTAINING (A) ORGANOALUMINUM COMPOUND AND (B) ALKYL HALIDE OR HYDROGEN HALIDE AS COCATALYST

This invention relates to a process for manufacturing a novel petroleum resin having excellent characteristics as a tackifier for use in a hot-melt adhesive.

It has been generally known that a copolymer is obtained by copolymerizing a three-component mixture comprising isobutylene, styrene, and divinylbenzene with a Friedel-Crafts catalyst such as aluminum chloride at a low temperature, 0° C or lower. The resin obtained by such a method, however, is undesirable as a tackifier for use in hot-melt adhesives because of its poor compatibility with ethylene-vinyl acetate copolymers and other polymers and because of discoloration and their disadvantages.

An object of this invention is to provide a petroleum resin for use as a tackifier for hot-melt adhesives and other materials, which is excellent in compatibility, tackiness, color, and, in addition, in thermal stability and solubility.

Another object of this invention is to provide a process for manufacturing the above-said petroleum resin for aliphatic monoolefins, styrene and/or styrene derivatives and divinylbenzene.

A further object of this invention is to utilize monoolefins in the $C_4$- and $C_5$ fractions produced is petroleum cracking to the best advantage as the above-said monoolefin source.

Other objects of this invention will become apparent from the following description.

The present inventors had been engaged in investigations on the advantageous utilization of a so-called spent $C_4$- or $C_5$-fraction obtained by removing most of the dienic constituents from the $C_4$- or $C_5$-fraction produced in petroleum cracking. As a result, it was found that the monoolefins in these fractions are easily copolymerizable with styrene and/or a styrene derivative in a hydrocarbon solvent at 0° to 60° C by use of a catalyst system comprising an organoaluminum compound represented by the general formula $AlR_nX_{3-n}$ (wherein R is an alkyl group having 1 to 4 carbon atoms, X is a halogen atom, and $n$ is 1 to 2) as main catalyst and an alkyl halide or hydrogen halide as co-catalyst, and there is obtained a colorless and clear resin having sufficiently good compatibility and tackiness for use as a tackifier in hot-melt adhesives. The compatibility of this petroleum resin, however, decreased chiefly with the increase in styrene and its derivatives content of the resin.

On the other hand, as to thermal stability of hot-melt adhesives, it is preferable to use a tackifier having a higher softening point, and accordingly, a resin having a higher content of styrene and styrene derivatives is better.

The present inventors, therefore, directed their efforts to the manufacture of a resin which is relatively low in styrene and styrene derivatives content, yet has a high softening point and found that when a mixture of a spent $C_4$- or $C_5$-fraction and styrene and/or a styrene derivative is admixed with 0.5 to 10 parts by weight of divinylbenzene for 100 parts by weight of monomeric constituents contained in said mixture and the resulting composition is copolymerized, there is obtained a colorless and clear resin having a higher softening point and superior compatibility as compared with a copolymer obtained from said mixture alone. Based on this finding, the present invention has been accomplished.

Since the petroleum resin obtained according to this invention is excellent in compatibility, tackiness, color, and, in addition, in thermal stability as well as solubility, it may be used satisfactorily as a tackifier for use not only in hot-melt adhesives, but also in adhesive tapes, synthetic rubbers, sealants, and the like.

Although preferred for use in the present method are the spent $C_4$- and $C_5$-fractions obtained by removing all of the dienic constituents such as butadiene, isoprene, 1,3-pentadiene, and cyclopentadiene from the fractions of four and five carbon atoms, respectively, produced in petroleum cracking, nevertheless those obtained by removing most of the dienic constituents until the residual amount becomes 5 % by weight or less can also be used with substantially the same results without causing any discoloration of the resin due to the dienic constituents.

The spent $C_4$- or $C_5$-fraction is used as such or, if necessary, as an admixture with $C_4$- or $C_5$- monoolefins such as butene-1, isobutylene, pentene-1, 2-methylbutene-1, and 3-methylbutene-1. The most suitable starting material for use in this invention is the so-called spent $C_4$-fraction obtained by removing butadiene from the $C_4$-fraction produced in petroleum cracking.

The styrene and its derivatives for use in this invention include styrene, α-methylstyrene, vinyltoluene, and dimethylstyrene, which may be used each alone or in mixtures of two or more.

The monomer composition for the copolymerization consists of a mixture of 20 to 80 parts by weight of a spent $C_4$-or $C_5$-fraction and 80 to 20 parts by weight of styrene and/or a styrene derivative and 0.5 to 10 parts by weight of admixed divinylbenzene for 100 parts by weight of the monomeric constituents contained in said mixture. When a petroleum resin of high softening point is required, a relatively larger amount of styrene, a styrene derivative, or divinylbenzene is used. If the amount of spent $C_4$- or $C_5$-fraction is reduced below 20 parts by weight, a resin with markedly reduced compatibility is formed, while if it exceeds 80 parts by weight, the softening point of the resin becomes relatively low, both resins being undesirable for the object of this invention. A preferable proportion is 60 to 40 parts by weight of styrene and/or a styrene derivative for 40 to 60 parts by weight of the spent $C_4$- or $C_5$-fraction. The amount of divinylbenzene to be added to the monomer mixture is in the range from 0.5 to 10, preferably from 2 to 7, parts by weight for 100 parts by weight of the monomeric constituents contained in said mixture, because if the amount is below 0.5 part by weight, no effect due to divinylbenzene will be recognizable, while if it exceeds 10 parts by weight, there will be formation of a gel-like substance or the compatibility of the resin will become inferior, depending on the composition of monomer mixture and the polymerization conditions.

The catalyst system used in the present method comprises an organoaluminum compound represented by the general formula $AlR_nX_{3-n}$ (where R is an alkyl group having 1 to 4 carbon atoms, X is a halogen atom, and $n$ is a positive number from 1 to 2) and a cocatalyst selected from alkyl halides and hydrogen halides. Such organoaluminum compound suitable for use are dimethylaluminum chloride, diethylaluminum chloride, diisopropylaluminum chloride, diisobutylaluminum chloride, dimethylaluminum bromide, diethylaluminum bromide, methylaluminum sesquichloride, ethylaluminum sesquichloride, ethylaluminum sesquibromide, methylaluminum dichloride, ethylaluminum dichloride, and ethylaluminum dibromide. Of these, diethylaluminum chloride, ethylaluminum sesquichloride, and ethylaluminum dichloride are preferred. These organoaluminum compounds can be used also in mixtures of two or more.

The alkyl halides used as co-catalysts in combination with the organoaluminum compound are isopropyl chloride, isobutyl chloride, sec-butyl chloride, tert-butyl chloride, tert-butyl bromide, etc. Of these, tert-butyl chloride and tert-butyl bromide are preferred. The suitable hydrogen halides are hydrogen chloride and hydrogen bromide. These alkyl halides and hydrogen halides can be used in mixtures of two or more. The molar ratio of the co-catalyst to the organoaluminum compound if from 0.01 to 2, preferably from 0.1 to 1. If the molar ratio of a co-catalyst to an organoaluminum compound is below 0.01 or above 2, the catalyst activity becomes inferior and unsuitable for achieving the object of this invention.

The amount of organoaluminum compound to be used is 0.1 to 5 % by weight, preferably 0.5 to 3 % by weight based on the monomeric constituents. If it is used in an amount below 0.1 % by weight, the monomer conversion becomes decreased, while if it is used in an amount exceeding 5 % by weight, the conversion will scarcely be increased.

The contact of monomers with catalyst system can be conducted either after the organoaluminum compound and co-catalyst have been mixed or by mixing both components of the catalyst system in the presence of a monomer composition in a polymerization reactor.

The hydrocarbon solvents to be used in the present method include aliphatic hydrocarbons such as hexane, heptane, and the like, aromatic hydrocarbons such as benzene, toluene, xylene, ethylbenzene, and the like, and cyclohexane. Further, the paraffins contained in spent $C_4$- and $C_5$-fractions can be utilized conveniently as solvent.

Since an aliphatic hydrocarbon solvent tends to increase the softening point of the resin formed, while an aromatic solvent tends to decrease the softening point, it is possible to use these two types of hydrocarbons in suitable mixtures according to the intended object.

In view of the dispersion of catalyst and the removal of heat of polymerization, a suitable weight ratio of the hydrocarbon solvent to the monomeric constituents is in the range from 0.2 to 3.0, preferably from 0.5 to 2.0.

The polymerization can be carried out at a temperature in the range from 0° to 60° C, preferably from 10° to 50° C. If the polymerization temperature is below 0° C, a resin of high molecular weight and poor compatibility will be formed, while if it exceeds 60° C, only a resin with very low molecular weight will be formed. When such resins are used as a tackifier in a hot-melt adhesive, there may arise such undesirable problems as insufficient compatibility of fuming.

The polymerization according to this invention can be carried out by any polymerization procedure such as batchwise polymerization, semi-batchwise polymerization, or continuous polymerization.

The polymerization is conducted generally for 3 minutes to 5 hours, though there is no particular restriction on the duration of polymerization.

The polymerizate solution obtained according to this invention is contacted with, for example, methanol to terminate polymerization, washed with an alkali solution and water to remove the catalyst residue, and freed from the solvent and low-molecular weight polymer by concentration to obtain the petroleum resin.

The invention is illustrated below in detail with reference to Examples, but the invention is not limited thereto.

Of the physical characteristics of the resins shown in Examples, the softening point was measured by the ring and ball method specified in JIS K 2531 and the molecular weight (number-average molecular weight) was determined by Vapor Pressure Osmometry techniques.

EXAMPLE 1

Into a 300-ml glass reactor provided with a thermometer, reflux condenser, stirrer, monomer inlet, catalyst inlet, and overflow exit, which has been flushed with nitrogen to replace the air, was fed at a rate of 1 liter/hour through the monomer inlet a mixture comprising 22.5 parts by weight of the spent $C_4$-fraction having a composition shown in Table 3, 22.5 parts by weight of styrene, 2.5 parts by weight of an ethylbenzene solution cotaining 55 % of divinylbenzene (3.2 parts by weight of divinylbenzene for 100 parts by weight of the monomeric constituents), 5 parts by weight of xylene, 45 parts by weight of heptane, and 0.076 parts by weight of hydrogen chloride. At the same time, on the other hand, into the reactor was fed at a rate of 43 ml/hour a xylene solution containing 10 % by weight of diethylaluminum chloride (concentration of diethylaluminum chloride based on monomeric constituents, 1 % by weight; molar ratio of diethylaluminum chloride to hydrogen chloride, 1/0.5 ). Polymerization was carried out with stirring while removing the polymerization heat by external cooling to maintain the polymerization temperature at 25° C. The polymerizate solution which flowed out of the overflow exit was continuously contacted with methanol to terminate polymerization. The polymerizate solution (after polymerization had been terminated by contact with methanol) obtained during an interval of 15 minutes after one hour from the start of polymerization was washed by mixing with 30 ml of an aqueous solution containing 20 % by weight of sodium hydroxide and the spent aqueous solution was removed by decantation. The resulting polymer solution was concentrated in a rotary evaporator under reduced pressure (150 mmHg) at 230° C under a nitrogen stream. A colorless clear petroleum resin having a softening point of 81° C and a molecular weight of 1,200 was obtained in yield of 71 %. The performance characteristics of the resin as a hot-melt adhesive as compared with a commercial petroleum resin (Arkon M-90, made by Arakawa Forest Chemical Industries, Ltd.) were as shown in Table 1. Composition of the hot-melt adhesive: Sumitate KC-10 (Sumitomo Chemical Company, Ltd.)/petroleum resin/160° F Praffin Wax (Nippon Seiro Co., Ltd.) = 35/45/20.

Table 1

| Result of test on hot-melt adhesive | | |
|---|---|---|
| Petroleum resin | Example 1 | Commercial petroleum resin |
| Molten viscosity (180° C), cps | 1,100 | 1,200 |
| Open setting time *1, second | 21 - 22 | 23 - 24 |
| Setting time *2, second | 1 - 2 | 1 - 2 |
| Low-temperature brittle point *3, ° C | − 5 | + 5 |
| Peeling strength *4 (23° C, 65 % RH), kg/25 mm | | |
| Fabric to fabric | 2.7 | 2.0 |

Table 1-continued

| Result of test on hot-melt adhesive | | |
|---|---|---|
| Petroleum resin | Example 1 | Commercial petroleum resin |
| Fabric to aluminum | 1.7 | 1.5 |
| Fabric to polystyrene | 2.9 | 1.8 |
| Fabric to polypropylene | 0.79 | 0.52 |
| Fabric to polyethylene | 0.41 | 0.12 |
| Compatibility | Good | Good |
| Thermal stability (180° C) | Good | Poor (fuming) |

Note:
*1 After applying hot-melt adhesive molten at 180° C on wooden test specimen, the longest time required to form hot-melt bond.
*2 After applying hot-melt adhesive molten at 180° C on wooden test specimen and binding immediately, the shortest time to form hot-melt bond by hardening. (an adhesion of 1 kg/25 mm × 5 mm or higher).
*3 Flex test (4 mm φ) with test specimen, 1 mm in thickness.
*4 Peeling strength (180° separation angle; 200 mm/min separation rate).

As is apparent from Table 1, a hot-melt adhesive prepared by use of this resin was distinguished in low-temperature resistance and thermal stability and, in addition, was excellent in compatibility and adhesion; hence, the resin could be used as an effective tackifier for a hot-melt adhesive.

The resins obtained in Examples 2 7 were similar in these propertis to the resin obtained above and could be used as an effective tackifier for hot-melt adhesives.

EXAMPLES 2 to 6

Colorless clear petroleum resins having the physical properties shown in Table 2 were obtained in the same manner as in Example 1, except that monomer composition, solvent, polymerization temperature, main catalyst, and co-catalyst were varied as shown in Table 2.

EXAMPLE 7

Into a 250-ml three-neck glass autoclave provided with a thermometer, stirrer, and sample inlet, which has been flushed with nitrogen to replace the air, were charged with stirring 25 g of a spent $C_4$-fraction, 25 g of styrene, 5 g of a 55 -% ethylbenzene solution of divinylbenzene (amount of divinylbenze added for 100 parts by weight of monomeric constituents: 5.8 parts by weight), 40 g of xylene, and 10 g of a xylene solution containing 2.75 % by weight of tert-butyl bromide. Into the stirred autoclave maintained at 50° C, was fed 10 g of a xylene solution containing 5 % by weight of ethylaluminum dichloride by means of a plunger pump to initiate polymerization. After 10 minutes of feeding, the polymerization was continued for further 50 minutes at 50° C and then terminated by addition of 30 ml of methanol by means of a plunger pump. Thereafter, the polymerizate solution was washed and concentrated in the same manner as in Example 1 to obtain a colorless clear resin in a yield of 83 %. The resin had a softening point of 65° C and a molecular weight of 1,200.

COMPARATIVE EXAMPLE 1

The procedure of Example 1 was followed, except that 2.5 g of an ethylbenzene solution containing 55 % of divinylbenzene was not used. A resin having a softening point of 72° C and a molecular weight of 980 was obtained in a yield of 67 %. A hot-melt adhesive prepared by use of the above resin was inferior in thermal stability to the resin obtained in Example 1.

COMPARATIVE EXAMPLE 2

The procedure of Example 2 was followed, except that the amount of the 55 -% ethylbenzene solution of divinylbenzene was 10 g instead of 5 g. There was formed a large amount of gel-like precipitates and it was impossible to carry out steady polymerization. (The amount of divinylbenzene added was 13 parts by weight for 100 parts by weight of monomeric constituents.)

Table 3

| Composition of spent $C_4$-fraction | |
|---|---|
| Constituent | % By weight |
| Isobutane | 1.3 |
| n-Butane | 6.6 |
| 1-Butene | 24.0 |
| Isobutylene | 47.1 |
| trans-2-Butene | 10.2 |
| cis-2-Butene | 7.9 |

Table 2

Polymerization conditions and results of test

| | | Polymerization conditions | | | | | | | | Result | | | |
|---|---|---|---|---|---|---|---|---|---|---|---|---|---|
| | Composition of starting material (parts by weight) | | | | | | | | Temperature (° C) | Time (min.) | Yield (%) | Softening point (° C) | Molecular weight |
| Ex. No. | Olefin*1 | Styrene and styrene derivative | | *2 Divinylvenzene | | Solvent | | Co-catalyst | *3 Main catalyst | | | | | |
| 1 | $C_4$ 22.5 | Styrene | 22.5 | 2.5 | (3.2) | Xylene Heptane | 5 45 | HCl 0.076 | $AlEt_2Cl$ 1.0% | 25 | 18 | 71 | 81 | 1200 |
| 2 | $C_4$ 27 | Styrene | 18 | 5 | (6.5) | Heptane | 50 | t-$C_4H_9$Cl 0.19 | $AlEt_2Cl$ 1.0 | " | " | 70 | 81.5 | 1320 |
| 3 | $C_4$ 19 | Styrene | 28.5 | 2.5 | (3.0) | Xylene Heptane | 5 45 | HCl 0.076 | $AlEtCl_2$ 1.0 | " | " | 76 | 91 | 1390 |
| 4 | $C_4$ 20 | Vinyltoluene Styrene | 15 15 | 2.5 | (2.9) | Xylene | 50 | HCl 0.072 | $AlEtCl_2$ 1.0 | " | " | 75 | 77 | 1160 |
| 5 | $C_4$ 20 | α-Methylstyrene | 30 | 5 | (5.7) | Xylene | 50 | HCl 0.072 | $AlEtCl_2$ 1.0 | 25 | 18 | 40 | 66 | 1360 |
| 6 | $C_4$ 15 $C_5$ 35 | Styrene | 25 | 5 | (6.0) | Xylene | 25 | t-$C_4H_9$Cl 0.19 | $AlEt_{1.5}Cl_{1.5}$ 1.0 | 10 | 41 | 62 | 68 | 1200 |

Note:
*1 $C_4$: A spent $C_4$-fraction of the composition shown in Table 3. $C_5$: A spent $C_5$-fraction of the composition in Table 4.
*2 Amount of 55-% ethylbenzene solution of divinylbenzene. Amount of divinylbenzene for 100 parts by weight of monomeric constituents is shown in parentheses.
*3 Amount of organoaluminum compound in percent based on monomeric constituents. The organoaluminum compound was added as a 10-% by weight xylene solution.

Table 4

| Composition of spent $C_5$-fraction | |
|---|---|
| Constituent | % By weight |
| Isopentane | 25.1 |
| n-Pentane | 40.3 |
| 1-Pentene | 6.2 |
| 2-Methyl-1-butene <br> trans-2-Pentene | 13.2 |
| 2-Methylpentane <br> 2,3-Dimethylbutane <br> cis-2-Pentene | 2.7 |
| Others | 2.9 |

Table 4-continued

| Composition of spent $C_5$-fraction | |
|---|---|
| Constituent | % By weight |
| 3-Methylpentane } | 6.0 |
| 2-Methyl-2-butene | |
| cyclopentene | 1.7 |
| Others | 4.8 |

What is claimed is:

1. A process for manufacturing a petroleum resin, characterized by copolymerizing a monomer composition comprising (1) a mixture of 20 to 80 parts by weight of a so-called spent $C_4$- or $C_5$-fraction obtained by removing most of the dienic constituents from a fraction mainly of four or five carbon atoms formed in petroleum cracking and 80 to 20 parts by weight of styrene and/or a styrene derivative, and (2) 0.5 to 10 parts by weight of divinylbenzene for 100 parts by weight of the monomeric constituents contained in said mixture (1), with a catalyst system comprising an organoaluminum compound represented by the general formula $AlR_nX_{3-n}$ (wherein R is an alkyl group having 1 to 4 carbon atoms, X is a halogen atom, and $n$ is a positive number from 1 to 2) as main catalyst and an alkyl halide or a hydrogen halide as co-catalyst in a hydrocarbon solvent at a temperature of 0° to 60° C.

2. A process for manufacturing a petroleum resin according to claim 1, wherein total dienic constituents content of the spent $C_4$- or $C_5$-fraction is 5 % by weight or less.

3. A process for manufacturing a petroleum resin according to claim 1, wherein the monomer composition comprises (1) a mixture of 20 to 80 parts by weight of a spent $C_4$-fraction obtained by removing butadiene from a $C_4$-fraction formed in petroleum cracking and 80 to 20 parts by weight of styrene and/or a styrene derivative, and (2) 0.5 to 10 parts by weight of divinylbenzene for 100 parts by weight of the monomeric constituents contained in said mixture (1).

4. A process for manufacturing a petroleum resin according to claim 1, wherein the styrene and/or the styrene derivative is styrene, α-methylstyrene, vinyltoluene, dimethylstyrene, or a mixture of two or more of these.

5. A process for manufacturing a petroleum resin according to claim 1, wherein the mixture (1) comprises 40 to 60 parts by weight of the spent $C_4$- or $C_5$-fraction and 60 to 40 parts by weight of styrene and/or a styrene derivative.

6. A process for manufacturing a petroleum resin according to claim 1, wherein 2 to 7 parts by weight of divinylbenzene is used for 100 parts by weight of the monomeric constituents contained in the mixture (1) comprising a spent $C_4$- or $C_5$-fraction and styrene and/or a styrene derivative.

7. A process for manufacturing a petroleum resin according to claim 1, wherein the organoaluminum compound is diethylaluminum chloride, ethylaluminum sesquichloride, or ethylaluminum dichloride.

8. A process for manufacturing a petroleum resin according to claim 1, wherein the amount to be used of the organoaluminum compound is 0.5 to 3 % by weight based on monomeric constituents.

9. A process for manufacturing a petroleum resin according to claim 1, wherein the alkyl halide is tert-butyl chloride or tert-butyl bromide.

10. A process for manufacturing a petroleum resin according to claim 1, wherein the hydrogen halide is hydrogen chloride or hydrogen bromide.

11. A process for manufacturing a petroleum resin according to claim 1, wherein the molar ratio of the co-catalyst to the organoaluminum compound is in the range from 0.1 to 1.

12. A process for manufacturing a petroleum resin according to claim 1, wherein the hydrocarbon solvent is an aliphatic hydrocarbon selected from hexane, heptane, and other paraffins; an aromatic hydrocarbon selected from benzene, toluene, xylene, and ethylbenzene; cyclohexane, or a mixture of two or more of these.

13. A process for manufacturing a petroleum resin according to claim 1, wherein the weight ratio of the hydrocarbon solvent to the monomeric constituents is in the range from 0.5 to 2.0.

14. A process for manufacturing a petroleum resin according to claim 1, wherein the copolymerization is carried out at a temperature in the range from 10° to 50° C.

15. A petroleum resin obtained by the process according to claim 1.

16. A tackifier for hot-melt adhesives, adhesive tapes, synthetic rubbers, and sealants, which tackifier comprises the petroleum resin obtained by the process according to claim 1.

* * * * *